US005550774A

United States Patent [19]
Brauer et al.

[11] Patent Number: 5,550,774
[45] Date of Patent: Aug. 27, 1996

[54] MEMORY CACHE WITH LOW POWER CONSUMPTION AND METHOD OF OPERATION

[75] Inventors: Michael L. Brauer; Paul A. Reed; John L. Duncan, all of Austin, Tex.

[73] Assignee: Motorola, Inc., Schaumburg, Ill.

[21] Appl. No.: 523,663

[22] Filed: Sep. 5, 1995

[51] Int. Cl.[6] .................................................. G11C 8/00
[52] U.S. Cl. ............................. 365/189.02; 365/189.07; 365/230.02; 365/230.03
[58] Field of Search .................... 365/189.02, 189.07, 365/230.02, 230.03

[56] References Cited

U.S. PATENT DOCUMENTS

| | | | |
|---|---|---|---|
| 4,804,871 | 2/1989 | Walters, Jr. | 365/203 |
| 5,111,386 | 5/1992 | Fujishima et al. | 365/230.03 |
| 5,253,203 | 10/1993 | Partovi et al. | 365/189.02 |
| 5,497,347 | 3/1996 | Feng | 365/189.02 |

*Primary Examiner*—David C. Nelms
*Assistant Examiner*—Trong Phan
*Attorney, Agent, or Firm*—Lee E. Chastai

[57] ABSTRACT

A memory cache (46) has a plurality of tag arrays (20, 22, 24, 26), a plurality of comparators (38, 40, 42, 44), a plurality a data arrays (12, 14, 16, 18), and a plurality of sense amplifiers (48, 50, 52, 54). The memory cache executes a parallel tag and data array access but does not enable any sense amplifier until a comparator indicates a cache hit. Consequently, the memory cache is suitable for use where power consumption and speed are equally important design constraints.

18 Claims, 4 Drawing Sheets

MEMORY CACHE WITH LOW POWER CONSUMPTION AND METHOD OF OPERATION

FIELD OF THE INVENTION

The present invention generally relates to digital computing systems, and more specifically to an associative memory cache.

BACKGROUND OF THE INVENTION

Memory caches are storage systems incorporated into data processing systems for performance reasons. A memory cache stores a subset of the contents of the data processing system's main memory for use by a selected subsystem, typically the system's data processor. A memory cache can supply data to the data processor faster than the main memory can because of several reasons. First, the memory cache is often made of higher grade memory circuits than is the main memory system. These circuits can simply operate at a higher clock rate than can the main memory. Also, there may be an exclusive-use bus between the data processor and the memory cache that results in higher bandwidth between the data processor and the memory cache than between the data processor and the main memory. Finally, a memory cache may be physically located on the same integrated circuit as the subsystem to which it provides data. In this case, the memory cache is constructed from faster circuits and there is an exclusive-use bus between the memory cache and the data processor.

Associativity is one variable that defines memory cache designs. Associativity describes the number of memory cache locations to which each main memory subsystem location may be mapped. For instance, the contents of each main memory location may be mapped to one of four different locations in a four-way set associative memory cache. When the data processor requests the contents of a certain main memory location, the data processor compares the contents of a tag associated with each of the four possible storage locations to a portion of the address of the requested data. The tag is stored in a random access memory ("RAM") associated with each memory cache entry or "cache line." One or none of the tags will match the address portion depending upon the prior history of the data processor. If one of the tags matches, then the associated memory cache location contains the requested data, a cache "hit." In the case of a cache hit, the data processor can quickly access the cached data. If none of the tags match, then no memory cache location contains the requested data, a cache "miss." In the case of a cache miss, the data processor must access the main memory to retrieve the requested data.

Although memory caches were created to enhance performance, they detract from the performance of data processors in another way; power consumption. Generally, known memory caches waste power in two ways. First, the sense amplifier portion of known memory caches consume "crowbar" current. Second, known memory caches waste power by unnecessarily consuming switching current.

U.S. Pat. No. 4,804,871 entitled "Bit-line Isolated, CMOS Sense Amplifier" issued Feb. 14, 1989 describes a sense amplifier (16) which conveniently illustrates the consumption of crowbar current. FIG. 1 of the '871 patent depicts an exemplary column in one "way" of a memory cache. A signal (C3) couples the bitlines (B and $\overline{B}$) to a sense amplifier when de-asserted and enables the sense amplifier when asserted. While the bitlines are coupled to the output nodes (X and Y), they force the voltage on the output nodes to slowly separate, reflecting the output data value. The intermediate voltage level on these output nodes will partially turn on both the P device and the N device in a downstream complimentary metal oxide semiconductor (CMOS) device (not shown). Consequently, the downstream CMOS device will create a conductive path between its two power supplies. The longer the separation time, the greater is the crowbar current.

FIG. 1 depicts a block diagram of a known memory cache 10. Memory cache 10 conveniently illustrates the unnecessary consumption of switching current in known memory caches. Memory cache 10 is a four-way set-associative cache containing four data arrays 12, 14, 16, and 18 and four corresponding tag arrays 20, 22, 24, and 26. Each of the four data arrays 12, 14, 16, and 18 and the four corresponding tag arrays 20, 22, 24, and 26 receive the least significant portion of an input memory address (labeled LSB ADDRESS). Each of the four data arrays 12, 14, 16, and 18 has a corresponding sense amplifier 28, 30, 32, and 34. The output of sense amplifiers 28, 30, 32, and 34 are connected to a 4:1 multiplexer (labeled 4:1 MUX) 36. The output of MUX 36 is selected by the four control signals HIT0, HIT1, HIT2, and HIT3. A first comparator 38 compares the tag output of tag array 20 (WAY0) and a most significant portion of the input address (labeled MSB ADDRESS). A second comparator 40 compares the tag output of tag array 22 (WAY1) and MSB ADDRESS. A third comparator 42 compares the tag output of tag array 24 (WAY2) and MSB ADDRESS. A fourth comparator 44 compares the tag output of tag array 26 (WAY3) and MSB ADDRESS.

To increase the rate at which MUX 36 outputs DATA, memory cache 10 accesses the data stored in the four data arrays 12, 14, 16, and 18 and the four tag arrays 20, 22, 24, and 26 in parallel. Each of the four data arrays 12, 14, 16, and 18 outputs a data line through the corresponding sense amplifier 28, 30, 32, and 34 to MUX 36. Similarly, the four tag arrays 20, 22, 24, and 26 output four tags to the four comparators 38, 40, 42, and 44. (The four tag arrays 20, 22, 24, and 26 may or may not contain four sense amplifiers depending upon the number of entries in each tag array.) One or none of the four comparators 38, 40, 42, and 44 asserts its hit signal if the corresponding tag matches the most significant portion of ADDRESS.

Memory cache 10 consumes an excessive amount of switching current because it enables all four sense amplifiers 28, 30, 32, and 34 each read operation when, at most, only one data array will output a cache line as DATA OUT. Here, switching current describes the power consumed by a CMOS circuit when it changes logic state from "0" to "1" or vice versa. In general, N-1 sense amplifiers will unnecessarily sense a data value and drive the data value out to MUX 36 each cycle, where N is the associativeness of the memory cache.

SUMMARY OF THE INVENTION

In accordance with the present invention, there is disclosed a memory cache which substantially eliminates disadvantages of known memory caches. The disclosed invention claims a novel memory cache and method of operating a memory cache.

The disclosed memory cache comprises a plurality of tag arrays, comparators, data arrays, sense amplifiers and gates. The tag arrays and the data arrays output a set of tags and data lines, respectively, responsive to an input address. The gates are in a non-conductive state unless an associated comparator indicates that the data line output through the gate is the requested data line.

The disclosed method comprises the steps of first receiving an address in a plurality of tag arrays, first outputting a plurality of tags from the plurality of tag arrays, and comparing the plurality of tags to a subset of the address. The method also comprises the steps of second receiving the address in a plurality of data arrays, second enabling one of a plurality of sense amplifiers responsive to the step of comparing, and outputting a data line from the one of the sense amplifiers.

BRIEF DESCRIPTION OF THE DRAWINGS

The features and advantages of the present invention will be more clearly understood from the following detailed description taken in conjunction with the accompanying FIGURES where like numerals refer to like and corresponding parts and in which.

DETAILED DESCRIPTION OF A PREFERRED EMBODIMENT

Figure 2:
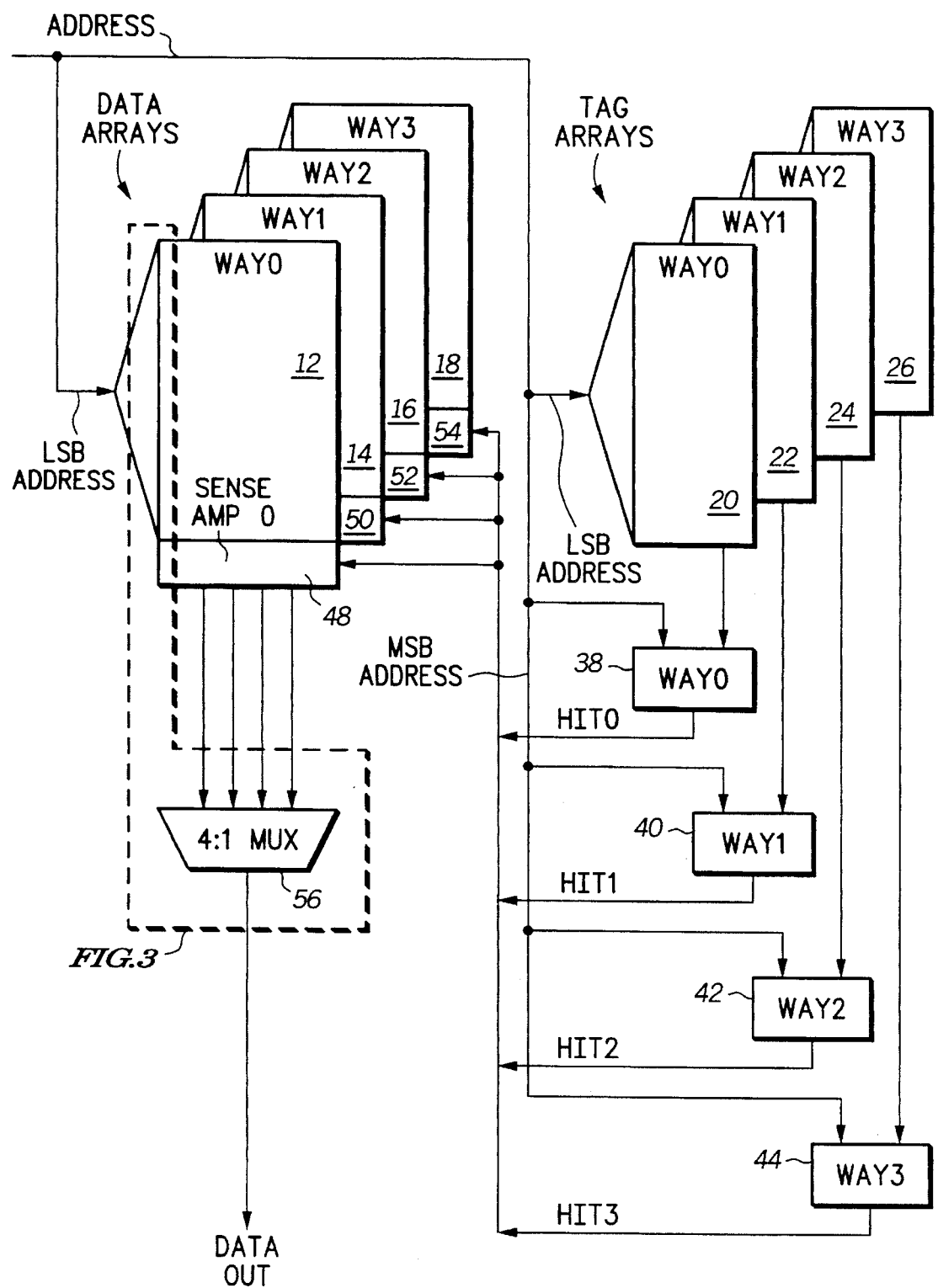
FIG. 2 depicts a block diagram of a memory cache constructed in accordance with the disclosed invention.

FIG. 2 depicts a block diagram of a memory cache 46 constructed in accordance with the disclosed invention. Memory cache 46 supports parallel data and tag look-up, allowing high performance. However, memory cache 46 is so constructed as to reduce its power consumption. Furthermore, memory cache 46 is approximately the same size as known designs. In modern integrated circuit design, circuit size translates directly into cost. Consequently, memory cache 46 is suitable for use in data processing systems in which performance, power consumption and cost are all important considerations.

Continuing with FIG. 2, memory cache 46 is a four-way set-associative cache containing four data arrays 12, 14, 16, and 18 and four corresponding tag arrays 20, 22, 24, and 26. However, the present invention can be extended to memory caches having associativeness of two or greater. Each of the four data arrays 12, 14, 16, and 18 and the four corresponding tag arrays 20, 22, 24, and 26 receive the least significant portion or bits of an input memory address (labeled LSB ADDRESS). Each of the four data arrays 12, 14, 16, and 18 has a corresponding sense amplifier 48, 50, 52, and 54. Sense amplifiers 48, 50, 52, and 54 are controlled by four control signals HIT0, HIT1, HIT2, and HIT3, respectively, as described below. The output of sense amplifiers 48, 50, 52, and 54 are connected to a 4:1 multiplexer (labeled 4:1 MUX) 56. A first comparator 38 compares the tag output of tag array 20 (WAY0) and a most significant portion of the input address (labeled MSB ADDRESS) to asserts the control signal WAY0 if the two inputs are equivalent. A second comparator 40 compares the tag output of tag array 22 (WAY1) to MSB ADDRESS and asserts the control signal WAY1 if the two inputs are equivalent. A third comparator 42 compares the tag output of tag array 24 (WAY2) to MSB ADDRESS and asserts the control signal WAY2 if the two inputs are equivalent. A fourth comparator 44 compares the tag output of tag array 26 (WAY3) to MSB ADDRESS and asserts the control signal WAY3 if the two inputs are equivalent.

Figure 1:
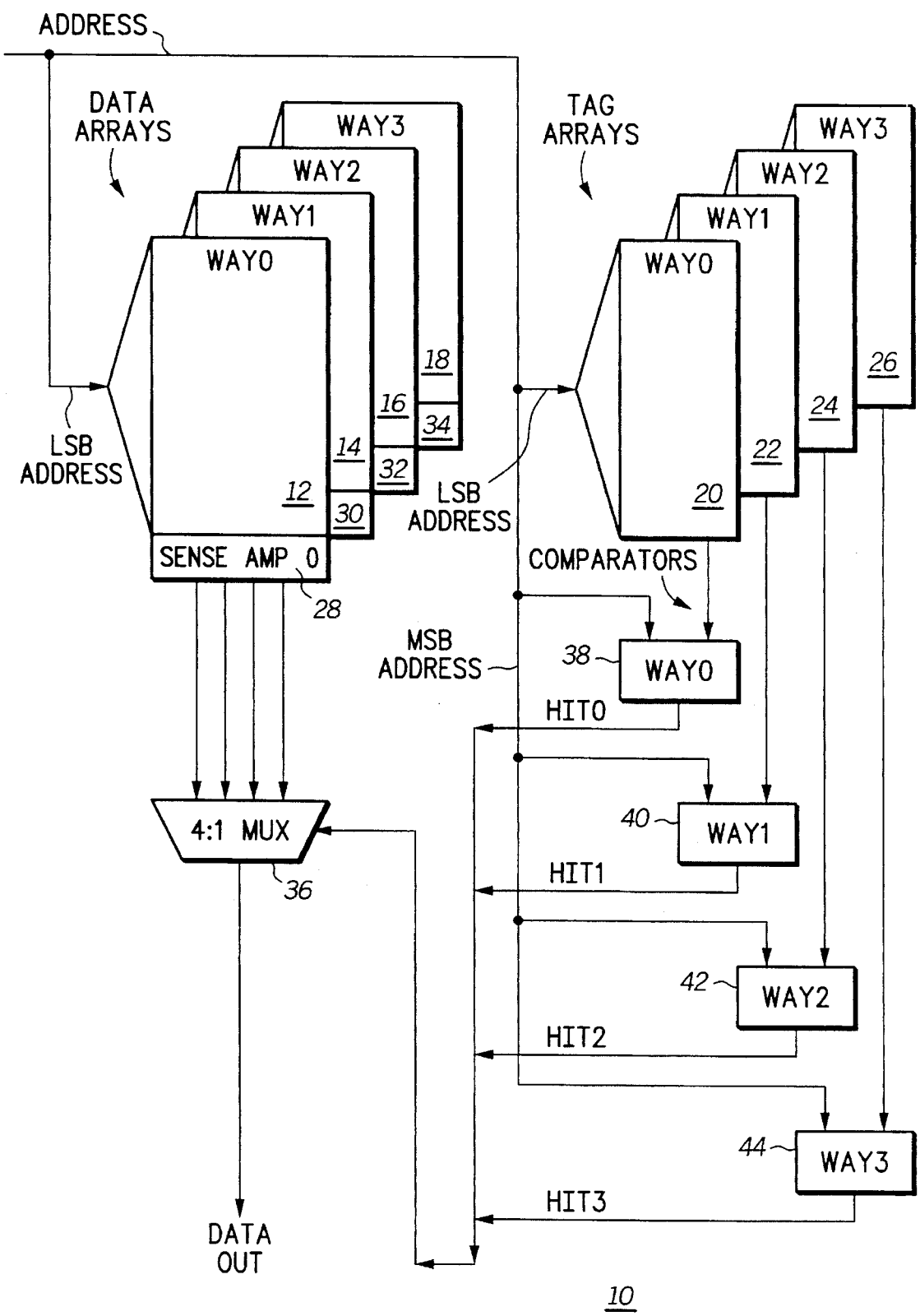
FIG. 1 depicts a block diagram of a known memory cache.

To increase the rate at which MUX 56 outputs DATA, memory cache 10 accesses the data stored in the four data arrays 12, 14, 16, and 18 and the four tag arrays 20, 22, 24, and 26 in parallel. However, the parallel operation of memory cache 46 differs from the parallel operation of memory cache 10 depicted in FIG. 1. In particular, the least significant portion of an input ADDRESS selects one tag from each of tag arrays 20, 22, 24, and 26 and one cache line from each of data arrays 12, 14, 16, and 18. Each of the four data arrays 12, 14, 16, and 18 couples its selected cache line to its bitlines (depicted in FIG. 3). However, sense amplifiers 48, 50, 52, and 54 are not enabled at this point. Simultaneously therewith, the four tag arrays 20, 22, 24, and 26 output four tags to the four comparators 38, 40, 42, and 44. (The four tag arrays 20, 22, 24, and 26 may or may not contain four sense amplifiers depending upon the number of entries in each tag array.) One or none of the four comparators 38, 40, 42, and 44 asserts its hit signal if the corresponding tag matches the most significant portion of ADDRESS. If one of the comparators detects an equivalence, then the one comparator asserts its hit signal, enabling one of sense amplifiers 48, 50, 52, or 54. This one sense amplifier forwards the selected cache line to MUX 56. The three remaining sense amplifiers are not enabled. If none of the comparators 38, 40, 42, and 44 detects an equivalence, then no comparator asserts its hit signal. In this case, each one of sense amplifiers 48, 50, 52, and 54 are disabled. In both of these cases, none of the unselected sense amplifiers are enabled, conserving power.

Figure 3:
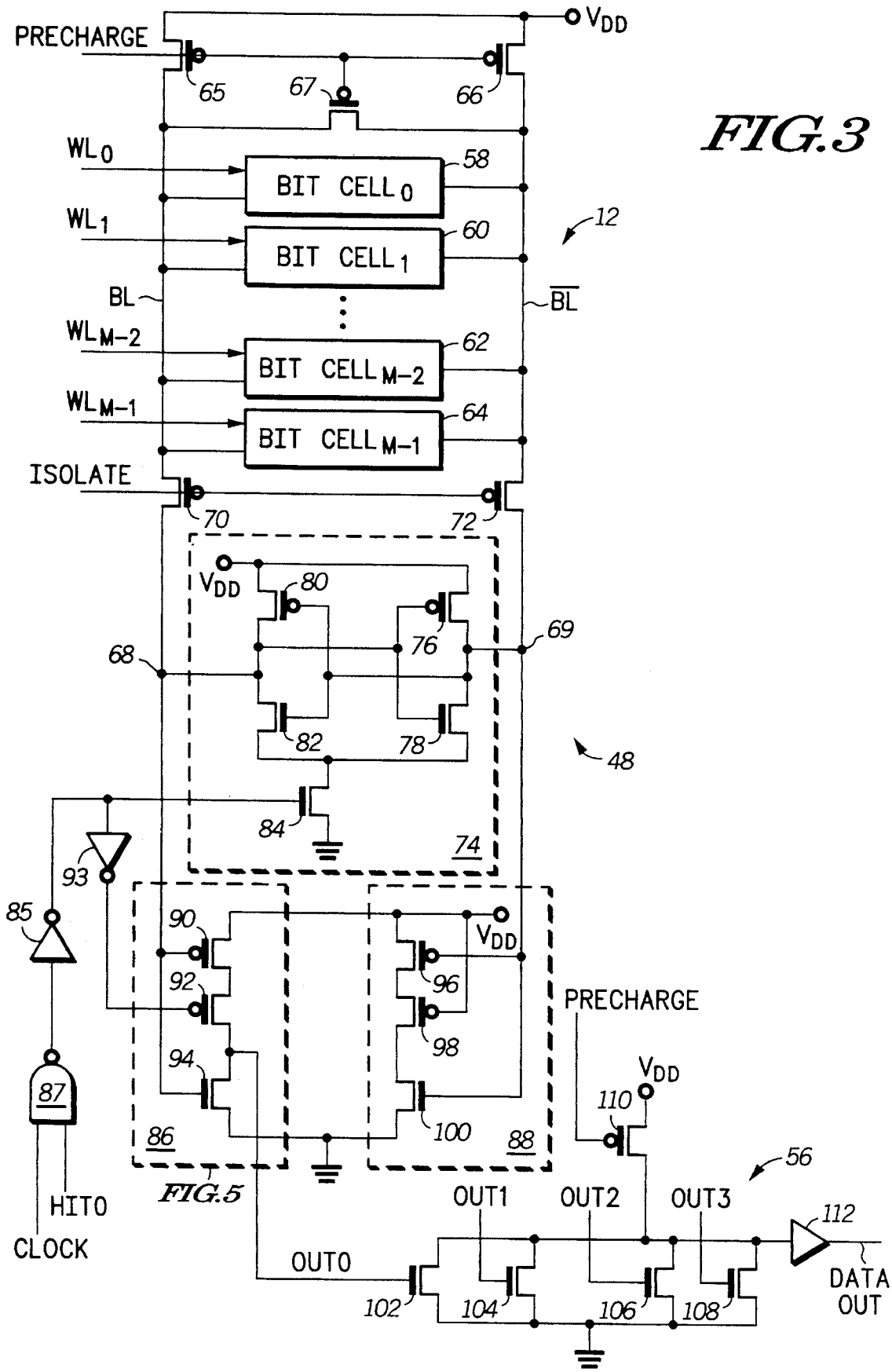
FIG. 3 depicts, in detail, a portion of the memory cache depicted in FIG. 2 and enclosed by a dashed line.

FIG. 3 depicts, in detail, a portion of the memory cache 46 depicted in FIG. 2 and enclosed by a dashed line. The depicted portion of memory cache 46 represents a one bit-wide slice of data array 12, sense amplifier 48 and MUX 56 (one bit by four-ways).

Each bit-wide slice of data array 12 contains a pair of bitlines (labeled BL and $\overline{BL}$ and pronounced bitline and bitline-bar) to which M bit cells 58, 60, . . . , 62, and 64 are connected in parallel, where M is an integer. In the depicted embodiment, each of the M bit cells 58, 60, . . . , 62, and 64 are well known six transistor ("6-T") static random access memory ("SRAM") cells. The Ith one of M bit cells 58, 60, . . . , 62, and 64 receives the Ith wordline, where I is an integer index ranging from 0 to M–1. A one-of-M decoder (not shown) asserts one wordline responsive to the less significant portion of the input ADDRESS. The one bit cell receiving the selected wordline couples its stored data value and the logical complement of the stored data value to the two bitlines. Three p-type transistors 65, 66, and 67 act to precharge the bitlines when a control signal PRECHARGE is active (low). A first control electrode of transistor 65 and 66 are coupled to a first voltage supply, labeled $V_{DD}$. A second control electrode of transistors 65 and 66 are coupled to the bitline and to the bitline-bar, respectively. A first and a second current electrode of transistor 67 are coupled to the bitline and to the bitline-bar, respectively. A control electrode of each of transistors 65, 66, and 67 receives the control signal PRECHARGE.

Each bit-wide slice of sense amplifier 48 contains a sensing node 68 and a sensing node-bar 69 which are selectively isolated from the bitlines of data array 12. A first current electrode of a first isolation transistor 70 and of a second isolation transistor 72 are coupled to the bitline and to the bitline-bar, respectively. A second current electrode of the first isolation transistor 70 and of the second isolation transistor 72 are coupled to the sensing node 68 and to the sensing node-bar 69, respectively. A control electrode of each of isolation transistors 70 and 72 receives the control signal ISOLATE. Isolation transistors 70 and 72 are p-type devices.

Sensing node 68 and a sensing node-bar 69 are coupled to the two inputs of a cross-coupled latch 74. Sensing node 68 is coupled to a control electrode of a p-type transistor 76 and to the control electrode of an n-type transistor 78. A first current electrode of transistor 76 receives the first voltage supply, $V_{DD}$. A second current electrode of transistor 76 is coupled to a first current electrode of transistor 78 and to the sensing node-bar 69. Sensing node-bar 69 is coupled to a control electrode of a p-type transistor 80 and to the control electrode of an n-type transistor 82. A first current electrode of transistor 80 receives the first voltage supply, $V_{DD}$. A second current electrode of transistor 80 is coupled to a first current electrode of transistor 82 and to the sensing node 68. A second current electrode of both of transistors 78 and 82 are connected to a first current electrode of an enabling n-type transistor 84. A second current electrode of transistor 84 receives a second voltage supply, labeled ground. A control electrode of transistor 84 receives a control signal generated by an output of an inverter 85. An input of inverter 85 is coupled to an output of a NAND gate 87. A first input of NAND gate 87 receives a periodic clocking signal CLOCK. A second input of NAND gate 87 receives the control signal HIT0 from comparator 38.

Sensing node 68 and sensing node-bar 69 are coupled to a first NOR gate 86 and to a second NOR gate 88, respectively. NOR gate 86 has a p-type transistor 90, a p-type transistor 92 and an n-type transistor 94. A first current electrode of transistor 90 receives the first voltage supply, $V_{DD}$. A control electrode of transistor 90 is coupled to sensing node 68. A second current electrode of transistor 90 is coupled to a first current electrode of transistor 92. A control electrode of transistor 92 is coupled to an output of an inverter 93. An input of inverter 93 is coupled to the output of inverter 85. A second current electrode of transistor 92 generates the output of NOR gate 86, OUT0. The second current electrode of transistor 92 is also coupled to a first current electrode of transistor 94. A control electrode of transistor 94 is coupled to sensing node 68. A second current electrode of transistor 94 receives the second voltage supply, labeled ground. NOR gate 88 has a p-type transistor 96, a p-type transistor 98 and an n-type transistor 100. A first current electrode of transistor 96 receives the first voltage supply, $V_{DD}$. A control electrode of transistor 96 is coupled to sensing node-bar 69. A second current electrode of transistor 96 is coupled to a first current electrode of transistor 98. A control electrode of transistor 98 receives the first voltage supply, $V_{DD}$. A second current electrode of transistor 98 is coupled to a first current electrode of transistor 100. A control electrode of transistor 100 is coupled to sensing node-bar 69. A second current electrode of transistor 100 receives the second voltage supply, labeled ground. NOR gate 88 generates no output. Instead, NOR gate 88 ensures that sense amplifier 48 operates symmetrically with respect to either a high sensed data value or a low sensed data value.

Each bit-wide slice of MUX 56 receives four inputs, OUT0, OUT1, OUT2, and OUT3, from the four sense amplifiers 28, 30, 32, and 34. For purposes of illustration, only the input WAY0 is connected to the corresponding sense amplifier 48. MUX 56 contains N n-type transistors, where N is the associativity of memory cache 46. Here, a first current conductor of each of four transistors 102, 104, 106, and 108 are connected together, to a first current conductor of a p-type transistor 110, and to an input of a buffer 112. Similarly, a second current conductor of each of four transistors 102, 104, 106, and 108 are connected together and receive the second voltage supply, labeled ground. A differing one of the gates of transistors 102, 104, 106, and 108 is connected to a differing one of the four inputs, OUT0, OUT1, OUT2, and OUT3. A second current conductor of transistor 110 receives the first voltage supply, VDD. A control electrode of transistor 110 receives the control signal PRECHARGE. An output of buffer 112 generates the output of MUX 56, DATA OUT.

Figure 4:
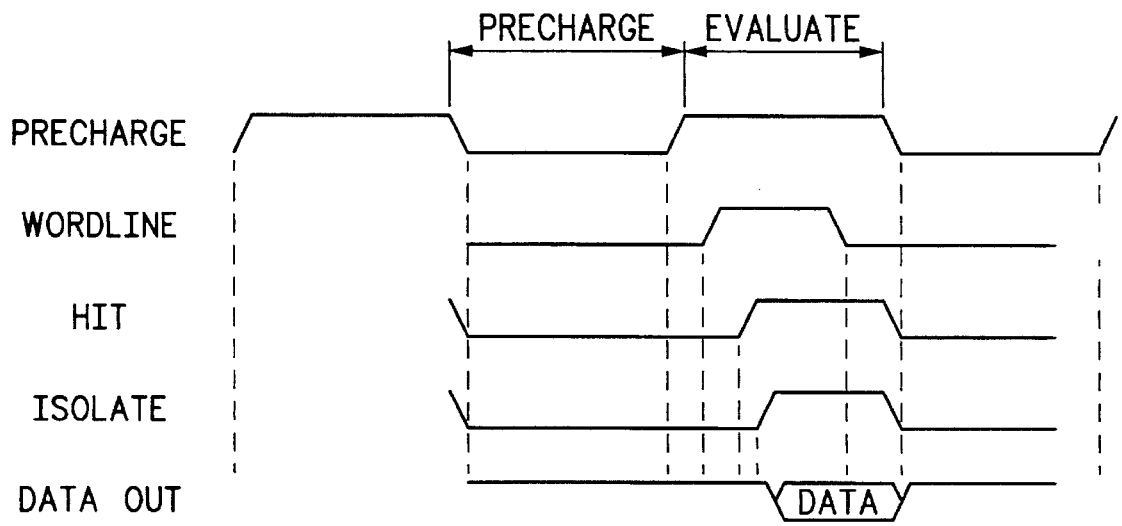
FIG. 4 depicts a timing diagram illustrating the operation of the disclosed invention.

FIG. 4 depicts a timing diagram illustrating the operation of the disclosed invention. The operation of memory cache 46 may be illustrated with respect to the two phases of the control signal PRECHARGE. For purposes of this invention, the control signal is equivalent to the periodic control signal CLOCK. During the low phase of the control signal PRECHARGE, data arrays 12, 14, 16, 18, sense amplifier 48, 50, 52, 54, and MUX 56 are precharged. During the high phase of the control signal PRECHARGE, data arrays 12, 14, 16, 18, sense amplifier 48, 50, 52, 54, and MUX 56 evaluate data.

During the low phase of the control signal PRECHARGE, the bitlines in each one of data arrays 12, 14, 16, 18 and the input to buffer 112 is precharged to a high logic state. Also, the various wordlines and the control signal ISOLATE are de-asserted. In other parts of memory cache 46, tag arrays 20, 22, 24, and 26 are precharged.

During the high phase of the control signal PRECHARGE, various control signals are asserted to evaluate data. First, the one-of-M decoder asserts one wordline responsive to LSB ADDRESS, coupling a selected bit cell to the bitlines. Next, the four hit signals are passed to the four NOR gates 86 from comparators 38, 40, 42, and 44. One or none of sense amplifiers 48 are thereby enabled. Finally, ISOLATE is asserted decoupling the bitlines from sense amplifier 48. Each of these control signals is de-asserted by the end of the high phase. In other parts of memory cache 46, tag arrays 20, 22, 24, and 26 evaluate an input address for a possible tag match.

Figure 5:
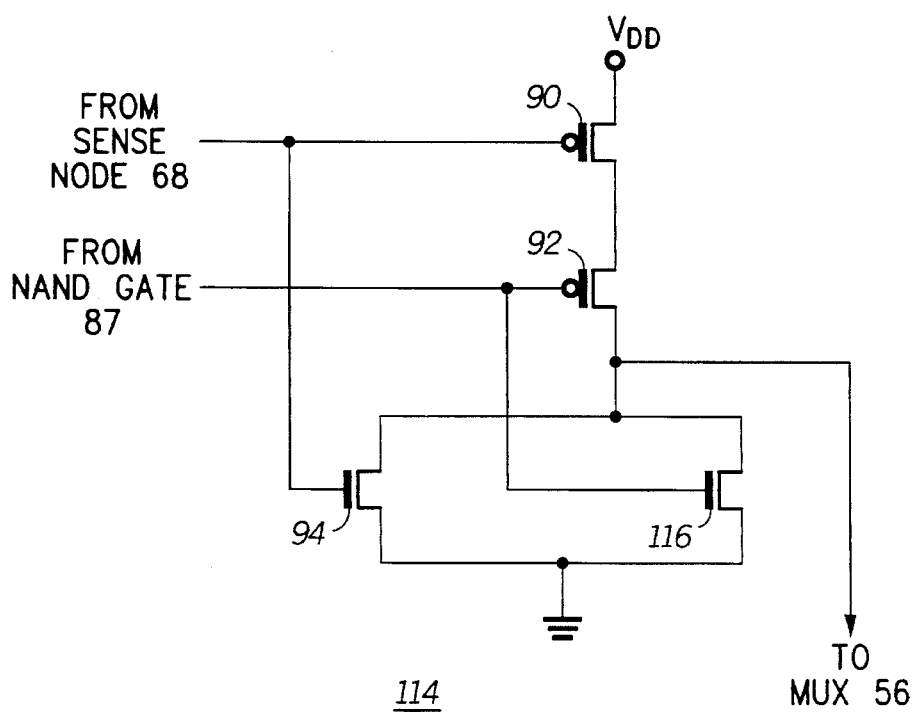
FIG. 5 depicts an alternate embodiment of the circuit depicted in FIG. 3 and enclosed by a dashed line.

FIG. 5 depicts an alternate embodiment 114 of the circuit depicted in FIG. 3 and enclosed by a dashed line. Alternate embodiment 114 is a full static NOR gate. Alternate embodiment 114 contains an additional n-type transistor 116. A first and a second current electrode of transistor 116 are coupled to the first current electrode of transistor 94 and to the second voltage supply, labeled ground, respectively. A control electrode of transistor 116 is coupled to the output of NAND gate 87. Alternate embodiment 114 may be advantageously incorporated into sense amplifier 48 if cycles times are long enough that OUT0 could inadvertently discharge when driven neither by transistor 94 nor by the combination of transistors 90 and 92.

Another embodiment of the disclosed invention may be warranted if the inputs HIT0, HIT1, HIT2, and HIT3 arrive too late to sense amplifiers 48, 50, 52, and 54. Such a condition could arise, for instance, if the comparisons performed by comparators 38, 40, 42, and 44 were conditioned upon an address translation step. Modern data processors often incorporate address mapping schemes to enable virtual memory, concurrent instruction processes, etc. If the most significant portion of the input ADDRESS must be first translated into a different address before comparison, then it is possible that sense amplifiers 48, 50, 52, and 54 would not be able to fully drive sense node 68 to the proper potential in the remaining time. In this case, enabling transistor 84 could be controlled independently of NOR gate 86. Specifically, another control signal would be coupled to the control electrode of transistor 84. This control signal would be asserted during the evaluate phase of the control signal PRECHARGE, one or more gate delays before the control signal ISOLATE is asserted. The resulting timing diagram would be identical to FIG. 4 with the substitution of "SENSE ENABLE" for "HIT." This embodiment, would not have the same power savings as the embodiment depicted in FIG. 3 because all sense amplifiers would be enabled each evaluate cycle. However, this alternate embodiment does not waste crowbar current through NOR gates 86, 88 and MUX 56.

Although the present invention has been described with reference to specific embodiments, further modifications and improvements will occur to those skilled in the art. For instance, the disclosed invention may stand alone or may be incorporated into a data processor. It is to be understood therefore, that the invention encompasses all such modifications that do not depart from the spirit and scope of the invention as defined in the appended claims.

What is claimed is:

1. A memory cache comprising:
   a plurality of tag arrays, each one of the plurality of tag arrays outputting a differing one of a plurality of tags responsive to an address;
   a plurality of comparators receiving the address, a differing one of the plurality of comparators also receiving a differing one of the plurality of tags and generating a differing one of a plurality of hit signals;
   a plurality of data arrays, each one of the plurality of data arrays outputting a differing one of a plurality of data lines responsive to the address;
   a plurality of sense amplifiers, each one of the plurality of sense amplifiers receiving a differing one of the plurality of data lines and outputting a differing one of a plurality of driven data lines; and
   a plurality of gates, a differing one of the plurality of gates receiving a differing one of the plurality of driven data lines and a differing one of the plurality of hit signals, each one of the plurality of gates outputting the differing one of the plurality of driven data signals responsive to a first logic state of the differing one of the plurality of hit signals and a current path between a first voltage supply and a second voltage supply of each one of the plurality of gates being in a non-conductive state responsive to a second logic state of the differing one of the plurality of hit signals.

2. The memory cache of claim 1 wherein each one of the plurality of sense amplifiers is enabled responsive to a differing one of the plurality of hit signals.

3. The memory cache of claim 2 further comprising a plurality of pairs of isolation transistors, a differing one of the plurality of pairs of isolation transistors coupled between a differing one of the plurality of data arrays and a differing one of the plurality of sense amplifiers.

4. The memory cache of claim 3 wherein each one of the plurality of sense amplifiers comprises:
   a first transistor of a first conductivity type comprising a first current electrode, a second electrode, and a control electrode, the first current electrode receiving a first voltage supply, the control electrode coupled to a first input node;
   a second transistor of a second conductivity type comprising a first current electrode, a second electrode, and a control electrode, the first current electrode coupled to the second current electrode of the first transistor, the control electrode coupled to the first input node;
   a third transistor of a first conductivity type comprising a first current electrode, a second electrode, and a control electrode, the first current electrode receiving the first voltage supply, the control electrode coupled to a second input node;
   a fourth transistor of the second conductivity type comprising a first current electrode, a second electrode, and a control electrode, the first current electrode coupled to the second current electrode of the third transistor, the control electrode coupled to the second input node; and
   a fifth transistor of the first conductivity type comprising a first current electrode, a second electrode, and a control electrode, the first current electrode coupled to the second current electrode of the second transistor and to the second current electrode of the fourth transistor, the control electrode receiving an enabling control signal, and the second current electrode receiving a second voltage supply.

5. The memory cache of claim 4 further comprising a plurality of transistors, each one of the plurality of transistors comprising a first current electrode, a second current electrode, and a control electrode, the first current electrode of each of the plurality of transistors coupled to an output node, the second current electrode of each of the plurality of transistors receiving the second voltage supply, and each control electrode of the plurality of transistors coupled to a differing one of the plurality of driven data lines.

6. The memory cache of claim 5 wherein each one of the plurality of sense amplifiers further comprises a NOR gate.

7. The memory cache of claim 1 further comprising a plurality of pairs of isolation transistors, a differing one of the plurality of pairs of isolation transistors coupled between a differing one of the plurality of data arrays and a differing one of the plurality of sense amplifiers.

8. The memory cache of claim 7 wherein each one of the plurality of sense amplifiers comprises:
   a first transistor of a first conductivity type comprising a first current electrode, a second electrode, and a control electrode, the first current electrode receiving a first voltage supply, the control electrode coupled to a first input node;
   a second transistor of a second conductivity type comprising a first current electrode, a second electrode, and a control electrode, the first current electrode coupled to the second current electrode of the first transistor, the control electrode coupled to the first input node;
   a third transistor of a first conductivity type comprising a first current electrode, a second electrode, and a control electrode, the first current electrode receiving the first voltage supply, the control electrode coupled to a second input node;
   a fourth transistor of the second conductivity type comprising a first current electrode, a second electrode, and a control electrode, the first current electrode coupled to the second current electrode of the third transistor, the control electrode coupled to the second input node; and
   a fifth transistor of the first conductivity type comprising a first current electrode, a second electrode, and a control electrode, the first current electrode coupled to the second current electrode of the second transistor and to the second current electrode of the fourth transistor, the control electrode receiving an enabling control signal, and the second current electrode receiving a second voltage supply.

9. The memory cache of claim 8 further comprising a plurality of transistors, each one of the plurality of transistors comprising a first current electrode, a second current electrode, and a control electrode, the first current electrode of each of the plurality of transistors coupled to an output node, the second current electrode of each of the plurality of transistors receiving the second voltage supply, and each control electrode of the plurality of transistors coupled to a differing one of the plurality of driven data lines.

10. The memory cache of claim 9 wherein each one of the plurality of sense amplifiers further comprises a NOR gate.

11. The memory cache of claim 1 wherein each one of the plurality of sense amplifiers comprises:

a first transistor of a first conductivity type comprising a first current electrode, a second electrode, and a control electrode, the first current electrode receiving a first voltage supply, the control electrode coupled to a first input node;

a second transistor of a second conductivity type comprising a first current electrode, a second electrode, and a control electrode, the first current electrode coupled to the second current electrode of the first transistor, the control electrode coupled to the first input node;

a third transistor of a first conductivity type comprising a first current electrode, a second electrode, and a control electrode, the first current electrode receiving the first voltage supply, the control electrode coupled to a second input node;

a fourth transistor of the second conductivity type comprising a first current electrode, a second electrode, and a control electrode, the first current electrode coupled to the second current electrode of the third transistor, the control electrode coupled to the second input node; and a fifth transistor of the first conductivity type comprising a first current electrode, a second electrode, and a control electrode, the first current electrode coupled to the second current electrode of the second transistor and to the second current electrode of the fourth transistor, the control electrode receiving an enabling control signal, and the second current electrode receiving a second voltage supply.

12. The memory cache of claim 11 further comprising a plurality of transistors, each one of the plurality of transistors comprising a first current electrode, a second current electrode, and a control electrode, the first current electrode of each of the plurality of transistors coupled to an output node, the second current electrode of each of the plurality of transistors receiving the second voltage supply, and each control electrode of the plurality of transistors coupled to a differing one of the plurality of driven data lines.

13. The memory cache of claim 12 wherein each one of the plurality of sense amplifiers further comprises a NOR gate.

14. The memory cache of claim 1 further comprising a plurality of transistors, each one of the plurality of transistors comprising a first current electrode, a second current electrode, and a control electrode, the first current electrode of each of the plurality of transistors coupled to an output node, the second current electrode of each of the plurality of transistors receiving the second voltage supply, and each control electrode of the plurality of transistors coupled to a differing one of the plurality of driven data lines.

15. The memory cache of claim 14 wherein each one of the plurality of sense amplifiers further comprises a NOR gate.

16. The memory cache of claim 1 wherein each one of the plurality of sense amplifiers further comprises a NOR gate.

17. An N-way set associative memory cache, where N is an integer greater than 1, the N-way set associative memory cache comprising:

N tag arrays outputting N tags responsive to an address;

N comparators comparing the N tags to a subset of the address and outputting N signals in response thereto;

N data arrays, each of one of the N data arrays comprising:

a memory means outputting a cache line responsive to the address; and a sense amplifier sensing the cache line, the sense amplifier enabled only responsive to a first state of one of the N signals.

18. A method of operating a memory cache comprising the steps of:

first receiving an address in a plurality of tag arrays;

first outputting a plurality of tags from the plurality of tag arrays;

comparing the plurality of tags to a subset of the address;

second receiving the address in a plurality of data arrays;

second enabling one of a plurality of sense amplifiers responsive to the step of comparing, a differing one of the plurality of sense amplifiers coupled to a differing one of the plurality of data arrays; and outputting a data line from the one of the plurality of sense amplifiers.

* * * * *